J. B. SPEED.
PROTECTIVE SYSTEM.
APPLICATION FILED SEPT. 3, 1915.

1,223,437.  Patented Apr. 24, 1917.

Witnesses:

Inventor:
James. B. Speed.
by ........... Atty.

UNITED STATES PATENT OFFICE.

JAMES BUCKNER SPEED, OF WEST NEW BRIGHTON, NEW YORK, ASSIGNOR, BY MESNE ASSIGNMENTS, TO WESTERN ELECTRIC COMPANY, INCORPORATED, A CORPORATION OF NEW YORK.

PROTECTIVE SYSTEM.

1,223,437.   Specification of Letters Patent.   Patented Apr. 24, 1917.

Application filed September 3, 1915. Serial No. 48,778.

*To all whom it may concern:*

Be it known that I, JAMES BUCKNER SPEED, a citizen of the United States, residing at West New Brighton, in the county of Richmond and State of New York, have invented certain new and useful Improvements in Protective Systems, of which the following is a full, clear, concise, and exact description.

This invention relates to the operation of protective reactances designed to protect the apparatus included in high power transmission circuits.

Heretofore in the operation of large power plants, it has been common to install large reactance coils between the bus bars and generators, and also between the bus bars and feeder circuits, and to have these reactances normally connected in the circuit they are designed to protect. When they are connected in this manner, there is considerable waste of electrical energy due to the iron losses, etc., occasioned by the continuous passage of current through the reactances. In time this loss of energy is considerable. It has been proposed to overcome this inefficient method of operating reactances by having them normally short-circuited and using quick tripping circuit breakers to open said short-circuit when dangerous trespassing currents are present. It has been found, however, that when a sudden electrical surge takes place in a circuit protected in this manner, the circuit breakers do not respond quickly enough to prevent the destructive effect which usually follows in such instances.

It is the object of this invention to eliminate the difficulties experienced as set forth above when reactances are employed for protective purposes.

In accordance with this invention, means are provided for opening a short-circuit about a reactance associated with a high power transmission circuit, said means including a detonating device adapted to be exploded by a second device responsive to the rate of change of current strength in said transmission circuit. The explosion of the detonating device disrupts the short-circuit about the reactance, thus permitting the same to function.

Figure 1:
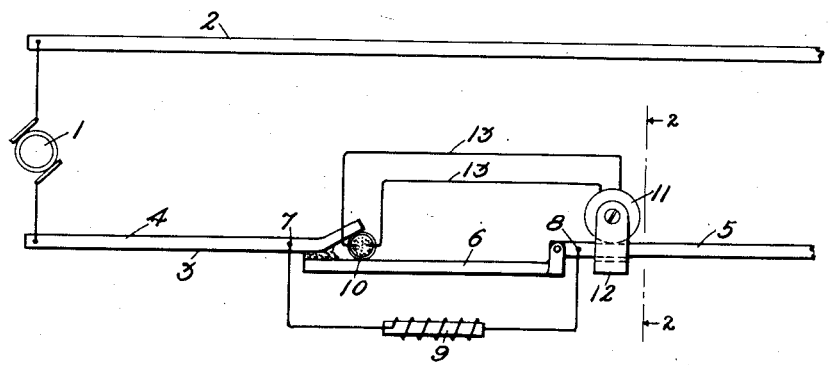
Figure 2:
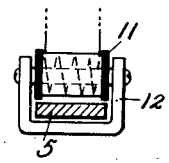

This invention is illustrated in the accompanying drawing, in which Figure 1 illustrates diagrammatically one of the arrangements by which this invention may be carried out; and Fig. 2 is a sectional view of the transformer shown in Fig. 1 taken on the line 2—2 of said figure.

In the drawings there is shown a source of current, such as a generator 1, bridged across a pair of conductors or bus bars 2 and 3. The continuity of the bus bar 3 is adapted to be interrupted by inserting as a portion thereof a switch. This may be accomplished by dividing said bus bar in two sections 4 and 5, which sections are connected by a bridging member 6, having one of its ends hinged to section 5 and its free end soldered to the opposing end of section 4. Connected in a shunt circuit with the bus bar 3 at points 7 and 8, which are exterior to the bridging member 6, is a reactance coil 9. The reactance coil 9 is normally short-circuited by that portion of the bus bar included between the points of connection 7 and 8 of the shunt circuit.

To open the switch in the bus bar 3 under conditions hereinafter to be explained, there is provided a detonating device 10 comprising any sort of an explosive element capable of being ignited by an electric spark. The end of section 4 of the bus bar 3 is turned up in the shape of a lip so as to form a receptacle between the soldered end of the bridging member 6 and said lip portion for the detonating device 10. To produce an electric spark there is provided a transformer 11, which utilizes the bus bar 3 as its primary. The secondary of the transformer 11 may comprise a helix or coil having an iron core upon which is wound a large number of turns of fine wire. This coil may be supported by having the ends of its core secured between the arms of a U-shaped bracket 12, said bracket being positioned so as to surround or inclose the bus bar 3 between the coil and the sides of the bracket, in a manner substantially as shown in Fig. 2. Having the transformer 11 constructed in this manner, an electromotive force will be induced therein whenever there is a sudden surge or rate of change in the strength of the current traversing the bus bar 3. This induced electromotive force will have a high potential difference which may be utilized to explode the detonating device 10 when conducted by conductors 13 to a pair of terminals separated by an air-gap provided with said device. It is obvious that the transformer 11 may be designed so that the minimum potential capable of producing an electric spark in the detonating device is induced only when the rate of change of current is greater than a certain value. This may be accomplished by regulating the size and number of turns of the wire comprising the secondary of said transformer, etc.

According to the circuit arrangement for operating protective reactances as contemplated by this invention, the current traversing the bus bar 3 will be substantially confined to said bus bar, as it offers considerably less resistance than the shunt circuit including the reactance coil 9. Whenever a dangerous current trespasses upon the bus bar 3, there will be a sudden change in the strength of the current formerly carried by said bus bar, which rate of change will set up an induced electromotive force in the transformer 11, said induced electromotive force having a high potential difference capable of effecting the explosion of the detonating device 10. The explosion of the detonating device 10 will be powerful enough to open the switch in the bus bar 3 by breaking open the bridging member 6 at the point where it is soldered to section 4 of said bus bar. By thus removing the short-circuit about the reactance 9, said reactance will be permitted to function.

From the above, it will be apparent that when dangerous currents become present, the reactance coils used for protective purposes will be allowed to function before the destructive effect of the dangerous current has made itself manifest upon the machinery desired to be protected, and when the reactances are not functioning there will be a minimum waste of current occasioned by their use.

What is claimed is:

1. A protective circuit comprising in combination with a power lead, an inductance in series with said lead, a switch normally short-circuiting said inductance, an inductance coil magnetically linked with said lead, and a detonating device in circuit with said inductance coil for opening said switch upon a sudden rush of current in said lead.

2. A protective circuit comprising in combination with a power lead, an inductance in series with said lead, a switch normally short-circuiting said inductance, a magnetic band surrounding said lead, an inductive winding on said band and a detonating device for opening said switch in series with said winding.

In witness whereof, I hereunto subscribe my name this 31st day of August, A. D. 1915.

JAMES BUCKNER SPEED.